United States Patent
van Veen et al.

(10) Patent No.: US 8,311,133 B2
(45) Date of Patent: Nov. 13, 2012

(54) METHOD AND APPARATUS FOR SENSING SIGNALING PARAMETERS IN A WIRELESS COMMUNICATIONS NETWORK

(75) Inventors: Durk L. van Veen, Santee, CA (US); Ashok Mantravadi, San Diego, CA (US); Raghuraman Krishnamoorthi, San Diego, CA (US); Murali Ramaswamy Chari, San Diego, CA (US); Krishna Kiran Mukkavilli, San Diego, CA (US); Fuyun Ling, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 11/834,653

(22) Filed: Aug. 6, 2007

(65) Prior Publication Data

US 2009/0028256 A1 Jan. 29, 2009

Related U.S. Application Data

(60) Provisional application No. 60/951,952, filed on Jul. 25, 2007.

(51) Int. Cl.
*H04L 27/28* (2006.01)
*H04B 7/216* (2006.01)

(52) U.S. Cl. ........ 375/260; 370/208; 370/330; 370/335; 370/342; 370/431; 370/441

(58) Field of Classification Search ........... 375/260, 375/343; 370/208, 349, 203, 311, 328–330, 370/350
See application file for complete search history.

(56) References Cited

U.S. PATENT DOCUMENTS

| | | | |
|---|---|---|---|
| 7,236,554 B2 | 6/2007 | Gupta | |
| 2005/0063298 A1* | 3/2005 | Ling et al. | 370/208 |
| 2005/0163265 A1* | 7/2005 | Gupta | 375/343 |
| 2006/0013325 A1* | 1/2006 | Agrawal et al. | 375/260 |
| 2006/0034379 A1* | 2/2006 | Yang | 375/260 |
| 2006/0123310 A1* | 6/2006 | Wang et al. | 714/746 |
| 2008/0107192 A1* | 5/2008 | Mukkavilli et al. | 375/260 |

FOREIGN PATENT DOCUMENTS

| | | |
|---|---|---|
| EP | 1718021 | 11/2006 |
| JP | 2007514331 A | 5/2007 |
| JP | 2007520168 A | 7/2007 |
| WO | WO2005122517 A1 | 12/2005 |

(Continued)

OTHER PUBLICATIONS

Murali R. Chari; Fuyun Ling; Ashok Mantravadi; Raghuraman Krishnamoorthi; Rajiv Vijayan; G. Kent Walker; Rob Chandhok; , "FLO Physical Layer: An Overview," Broadcasting, IEEE Transactions on , vol. 53, No. 1, pp. 145-160, Mar. 2007.*

(Continued)

*Primary Examiner* — David Ometz
*Assistant Examiner* — Eboni Hughes
(74) *Attorney, Agent, or Firm* — Ryan Farr (57) ABSTRACT

A new channel is added to FLO networks that carries embedded signaling parameter information. The design is such that regardless of the actual values of the signaling parameters conveyed, a receiver will be able to demodulate this new channel. Moreover, the addition of the new channel does not render a FLO network that has been so configured to not be backwards-compatible with existing devices.

40 Claims, 4 Drawing Sheets

100

FOREIGN PATENT DOCUMENTS

| | | | |
|---|---|---|---|
| WO | 2006099343 | | 9/2006 |
| WO | 2006110445 | | 10/2006 |
| WO | WO2006110445 | * | 10/2006 |
| WO | WO2006117150 A1 | | 11/2006 |
| WO | 2007045101 | | 4/2007 |
| WO | WO2007045101 | * | 4/2007 |

OTHER PUBLICATIONS

International Preminary Report on Patentability, PCT/US2008/071182, International Preliminary Examining Authority, European Patent Office, Nov. 17, 2009.

Murali R Chari et al "FLO Physical Layer: An Overview" IEEE Transactions on Broadcasting, vol. 53, No. 1, Mar. 1, 2007, pp. 145-160, XP011172013, IEEE Service Center, Piscataway, NJ, US, ISSN: 0018-9316, Figure 6, Sections III, IV. B.

Telecommunications Industry Association (TIA): "Project No. 3-0107-RV1, proposed revision of a TIA Standard, high Rate Broadcast Packet Data Air Interface Specification" EIA/TIA Drafts, TIA, Arlington, VA, US, Nov. 2, 2005, XP017005212, Sections 1.4, 1.6, 2.4.7.4.1, 2.4.7.4.1.1, 2.4.8.3.2.3.1.2.1.

International Search Report, PCT/US2008/071182, International Searching Authority, European Patent Office, Jul. 10, 2009.

Written Opinion, PCT/US2008/071182, International Searching Authority, European Patent Office, Jul. 10, 2009.

* cited by examiner

SPC symbol in time domain, periodic waveform, periodicity 1024 samples, 4 periods

FIG. 4

METHOD AND APPARATUS FOR SENSING SIGNALING PARAMETERS IN A WIRELESS COMMUNICATIONS NETWORK

CLAIM OF PRIORITY UNDER 35 U.S.C. §119

The present Application for Patent claims priority to Provisional Application No. 60/951,952 entitled "METHOD AND APPARATUS FOR SENSING OF SIGNALING PARAMETERS FOR A WIRELESS COMMUNICATIONS NETWORK" filed Jul. 26, 2007, and assigned to the assignee hereof and hereby expressly incorporated by reference herein.

BACKGROUND

1. Field

The present invention relates generally to wireless communications, and more particularly, to a method and apparatus for sensing signaling parameters in a wireless communications network.

2. Background

Wireless communication networks such as the Forward Link Only (FLO) network have been designed to provide real-time audio and video multicasting to mobile devices. The FLO system is designed to work in a mobile environment where the channel characteristics in terms of the number of channel taps with significant energy, path gains and the path delays are expected to vary quite significantly over a period of time. To achieve good receiver performance and high spectral efficiency, the FLO network uses Orthogonal Frequency Division Multiplexing (OFDM) as the modulation technique. In the OFDM approach, the available bandwidth is divided into N bins, referred to as sub-carriers, with each sub-carrier modulated by a Quadrature Amplitude Modulated (QAM) symbol. The timing synchronization block in a receiver device responds to changes in the channel profile by selecting the OFDM symbol boundary appropriately to maximize the energy captured in the Fast Fourier Transform (FFT) window.

One important principle of OFDM is that a number of low-rate streams is transmitted in parallel instead of a single high-rate stream, because low symbol rate modulation schemes (i.e., schemes where the symbols are relatively long compared to the channel time characteristics) suffer less from interference caused by multipath. Since the duration of each symbol is long, it is feasible to insert a guard interval between the OFDM symbols to reduce the intersymbol interference. During the guard interval, a cyclic prefix, which consists of the end of the OFDM symbol, is transmitted with the OFDM symbol. The reason that the guard interval includes a copy of the end of the OFDM symbol is so that the receiver will integrate over an integer number of sinusoid cycles for each of the multipaths when it performs OFDM demodulation with FFT.

The signaling parameters (SP) of a particular FLO network, such as the FFT size as well as the guard interval, need to be determined by a wireless receiver device during the power-up or initialization process. Otherwise, the receiver cannot decode the waveforms of the FLO network if it does not know the proper SP. Further, FLO networks can support multiple combination of SPs (i.e., a combination of different FFT sizes and multiple cyclic prefix lengths, among other parameters), and a wireless communications system may have multiple FLO networks, with each FLO network being differently configured. In other words, each FLO network may have a different set of SPs, where each FLO network being configured for a different FFT size and/or cyclic prefix length.

One problem encountered when implementing a mobile receiver moving between FLO networks that have different SPs is that the correct values for them cannot be conveyed to a receiver inside the FLO waveform itself using existing means, since symbol demodulation requires that the receiver would have already picked the correct values for these parameters.

SUMMARY OF THE PREFERRED EMBODIMENTS

The following presents a simplified summary of various configurations of the subject technology in order to provide a basic understanding of some aspects of the configurations. This summary is not an extensive overview. It is not intended to identify key/critical elements or to delineate the scope of the configurations disclosed herein. Its sole purpose is to present some concepts in a simplified form as a prelude to the more detailed description that is presented later.

The embodiments described herein adds a new channel to FLO networks that carries embedded signaling parameter information. The design is such that regardless of the actual values of the signaling parameters conveyed, a receiver will be able to demodulate this new channel. Moreover, the addition of the new channel does not render a FLO network that has been so configured to not be backwards-compatible with existing devices.

In one aspect of the disclosure, a method for sensing a signaling parameter in a forward link only (FLO) network includes determining a synchronization point on a transmitted data frame, the transmitted data frame having a plurality of Orthogonal Frequency Division Multiplexing (OFDM) symbols; locating a Signaling Parameter Channel (SPC) in the data frame; and, decoding at least one OFDM symbol associated with the SPC to determine the signaling parameter.

It is understood that other configurations will become readily apparent to those skilled in the art from the following detailed description, wherein it is shown and described only various configurations by way of illustration. As will be realized, the teachings herein may be extended to other and different configurations and its several details are capable of modification in various other respects, all without departing from the scope of the present disclosure. Accordingly, the drawings and detailed description are to be regarded as illustrative in nature and not as restrictive.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Before transmission, FLO data is generally organized into super-frames. Each super-frame has a one second duration. A super-frame generally consists of 1,200 symbols (or variable number of OFDM symbols based on the bandwidth being used) that are OFDM modulated with 4,096 sub-carriers. Among the 1,200 OFDM symbols in a super-frame, there are: two Time Division Multiplexed (TDM) pilot symbols (TDM1, TDM2); one Wide-Area and one Local Identification Channel (WIC and LIC, respectively) symbols; fourteen Overhead Information channel Symbols (OIS), including four Transitional Pilot Channel (TPC) symbols; and four data frames. Further, at the end of each super-frame, after the four data frames, two more symbols can be seen in FIG. 1. The final two symbols of each super-frame are occupied by the Signaling Parameter Channel (SPC) symbols. These symbols are used to convey certain signaling parameters to the receiver, such as the FFT size and the length of the cyclic prefix used for OIS and data channel symbols, as further described herein. The use of the SPC symbols ensures backwards compatibility because wireless devices that are not configured to decipher these symbols will simply ignore them. The structure of a super-frame 100 is illustrated in FIG. 1.

Figure 1:
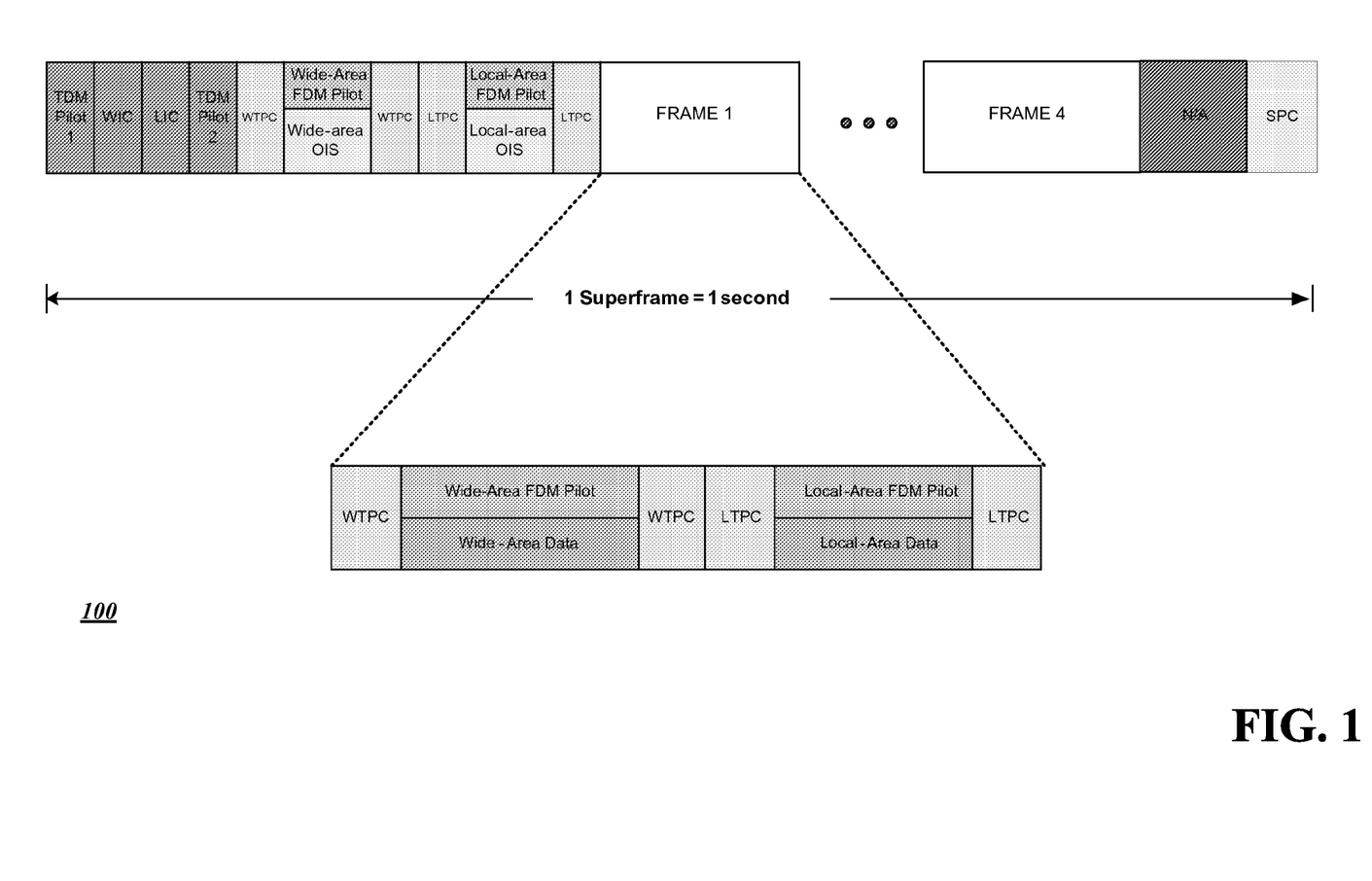
FIG. 1 illustrates an exemplary FLO physical layer superframe that has been configured to add support for the conveying of signaling parameter information to receivers using a signaling parameter channel (SPC).

Referring to FIG. 1, the relevant portions of the super-frame 100 are described herein. TDM Pilot Symbol 1 (TDM1) is the first OFDM symbol of each super-frame, where TDM1 is periodic. A receiver uses TDM1 for super-frame synchronization, as well as initial time (coarse timing) and frequency acquisition. After the location of TDM1 has been detected and therefore rough time and frequency synchronization has been achieved, the location of the symbols comprising the SPC, which is in a predetermined location, is now predictable. As noted previously, FLO signal parameters contained in the SPC comprise of the FFT size, cyclic prefix length, also known as the frequency guard interval (FGI), and the slot to interlace map being used by the FLO waveform. A FLO device needs to possess this information before the FLO waveform can be successfully decoded. The SP information that is conveyed in the SPC comprises two OFDM symbols. The information conveyed is as follows:

TABLE 1

Information conveyed by SPC

| SPC Symbol Index | Bits | OFDM Symbol Parameter |
|---|---|---|
| 0 | [p7p6p5] | FFT Size ($N_{FFT}$) |
| 0 | [p4p3] | Slot to interlace map |
| 0 | [p2p1p0] | $FGI_{Fraction}$ |
| 1 | [p7p6p5p4p3p2p1p0] | Reserved for Future Use |

For the purpose of system acquisition in this embodiment, only SPC symbol 0 needs to be processed since SPC symbol 1 contains reserved fields for future use. In essence, the FFT size, cyclic prefix length and slot to interlace map can be determined from the SPC symbols. In one embodiment, where the FLO network supports different combination of SPs, including different FFT sizes: 1024 (1k), 2048 (2k), 4096 (4k) and 8192 (8k); frequency guard intervals (FGI): 1/16, 1/8, 3/16 and 1/4; and slot to interface mappings, the mapping of the bits comprising the SPC symbols to different modes is as follows:

| Bits [p7p6p5] | FFT Size | Bits [p2p1p0] | FGI Fraction | Bits [p4p3] | Slot to Interlace mapping |
|---|---|---|---|---|---|
| 000 | 1024 | 000 | 1/16 | 00 | Mapping 1 |
| 001 | 2048 | 001 | 1/8 | 01 | Mapping 2 |
| 010 | 4096 | 010 | 3/16 | 10 | Mapping 3 |
| 011 | 8192 | 011 | 1/4 | 11 | Reserved for future use |
| 100-111 | Reserved for future use | 100-111 | Reserved for future use | | |

The last two symbols of each super-frame that comprise the SPC must be capable of being processed by the receiver without any prior knowledge about information such as the FFT mode and cyclic prefix settings in use on the transmission in order to determine these parameters. Because of this, the SPC needs to be generated independent of such settings so that the receiver hardware can process these symbols independent of these modes.

Figure 2:
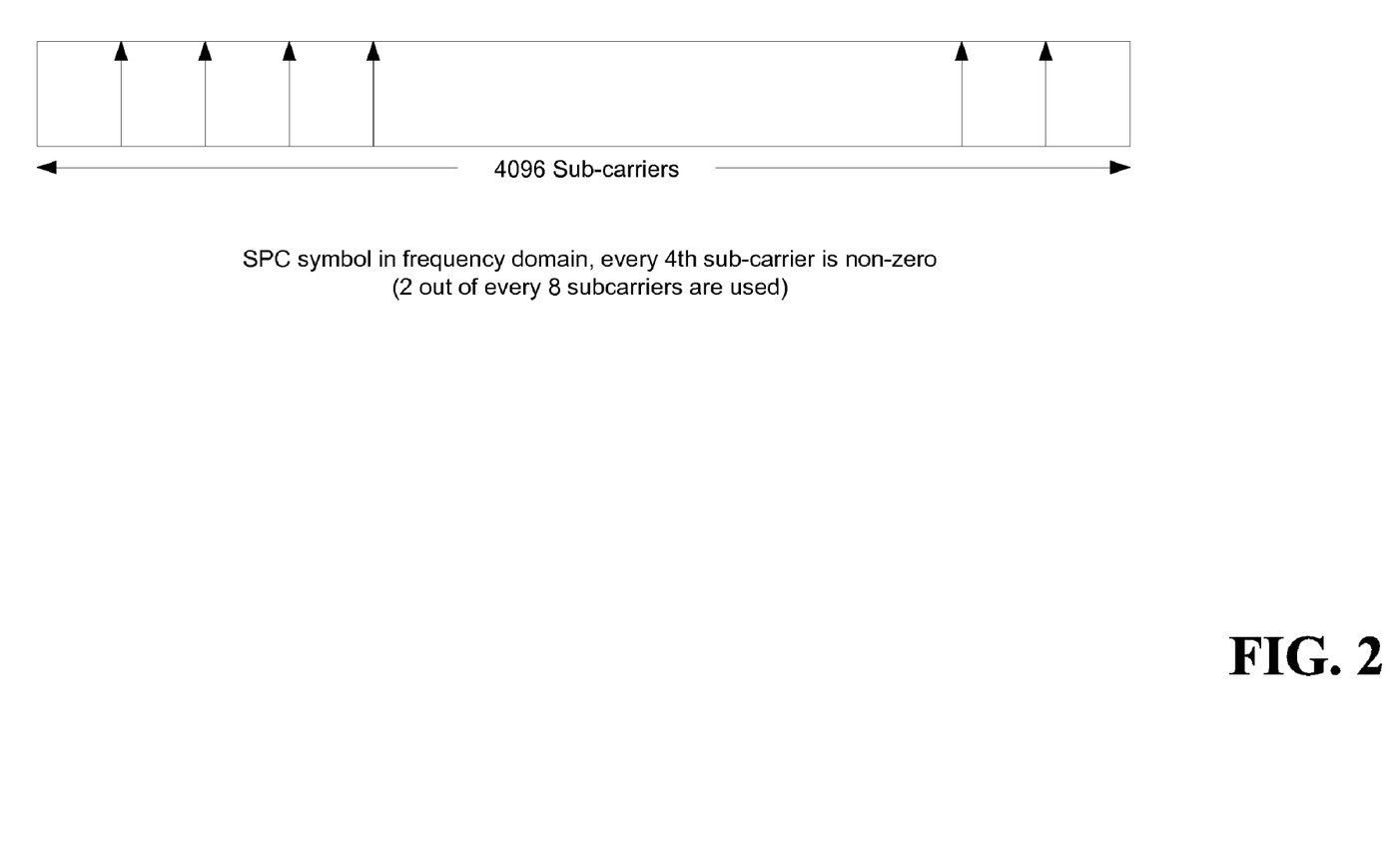
FIG. 2 illustrates the SPC symbols in the frequency domain, where every 4th sub-carrier is non-zero.
Figure 3:
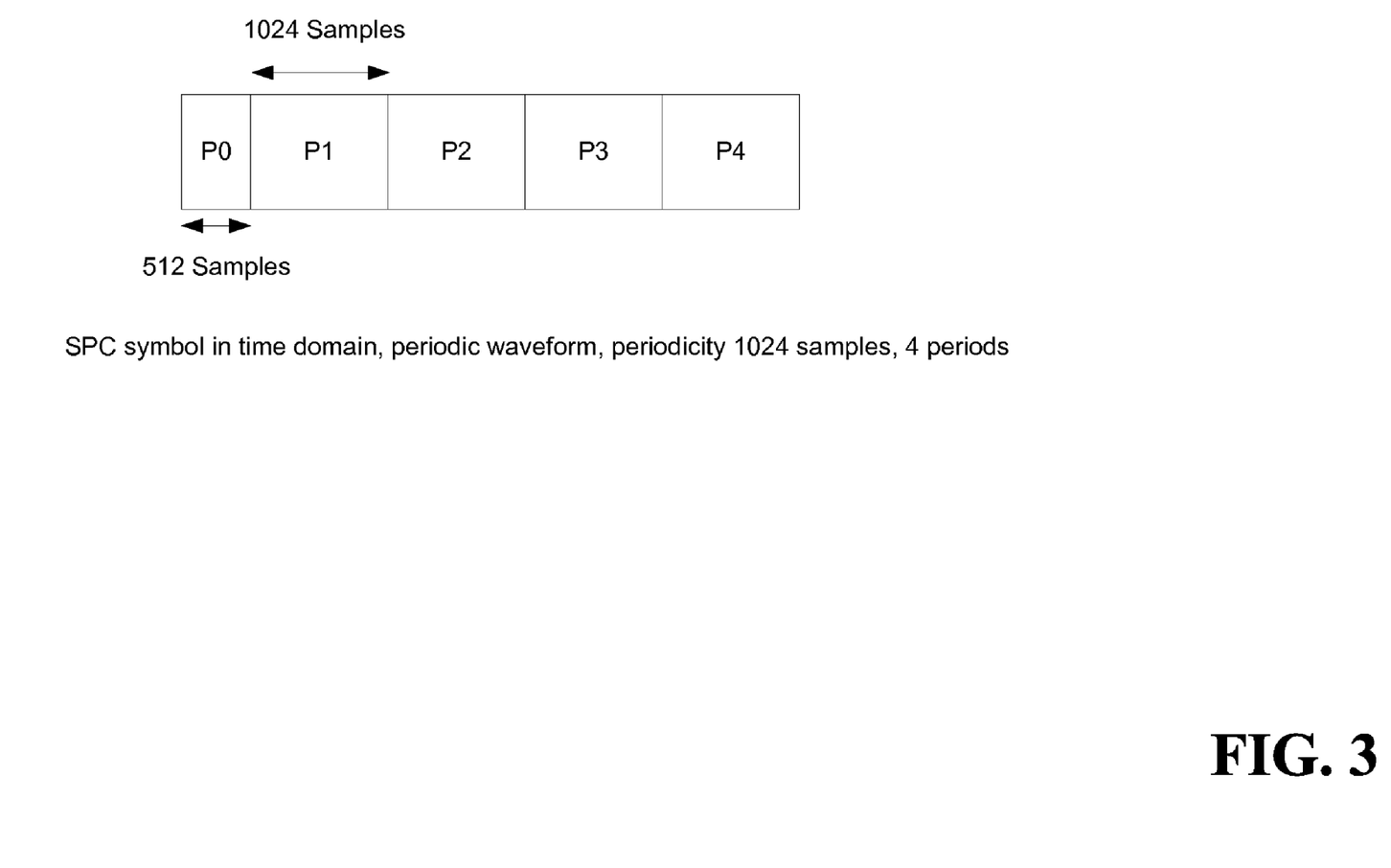
FIG. 3 illustrates the SPC symbols in the time domain.

The SPC symbols use modulation on one-fourth of the sub-carriers transmitted, as shown in FIG. 2. This results in a time-domain sequence with a periodicity of 1024 samples. Thus, in the time-domain, the symbols have four replicas excluding the cyclic prefix, of a sequence of length 1024, as seen in FIG. 3, which illustrates the SPC symbols in the time domain from a periodic waveform having a periodicity of 1024 samples in four periods. The periodicity and distance adds robustness in the presence of timing errors and frequency offsets. It should be noted that the energy used on each active sub-carrier can be scaled up with respect to regular data symbols in order to maintain constant transmitter output power across the entire super-frame.

For purposes of implementation in the transmitter, an interlace structure similar to the generation of data symbols is used. For example, in the 4K mode, equidistant sub-carriers with a distance of 4 correspond exactly to all active sub-carriers in interlaces 0 and 4. Each of these two interlaces consists of a number of modulation symbols. These modulation symbols are populated by using a fixed binary input pattern that can be scrambled with an SP-dependent seed and further XORed to guarantee the information on each interlace is different. Thus, four bits of useable information is encoded on each of the interlaces in use. Because there are a total of two SPC symbols, each containing two used interlaces, a total of 16 bits of information can be encoded within the entire SPC channel. This information word is denoted as $s_{15}s_{14}s_{13}s_{12}s_{11}s_{10}$ $s_9s_8s_7s_6s_5s_4s_3s_2s_1s_0$. In this particular exemplary embodiment, the 16 bits are encoded onto the SPC interlaces by initializing the scrambler seeds as follows:

SPC symbol #0, interlace 0: $s_7s_6s_5s_4$ 0000100 000000000
SPC symbol #0, interlace 4: $s_3s_2s_1s_0$ 0000100 000000000
SPC symbol #1, interlace 0: $s_{15}s_{14}s_{13}s_{12}$0000100000000001
SPC symbol #1, interlace 4: $s_{11}s_{10}s_9s_8$0000100000000001

It should be noted that the masks used in the scrambler are different for the two interlaces in use in each symbol to ensure uniqueness. The scrambled output sequence of this operation is mapped to a QPSK alphabet and carried on the active sub-carriers of the interlace in question. Thus, it is ensured that the two interlaces in a single SPC symbol do not end up becoming identical if the four bits carried on them are the same. On the receiver, the bits are recovered using hypothesis testing, in a procedure similar to WID/LID recovery from WIC/LIC channels.

Figure 4:
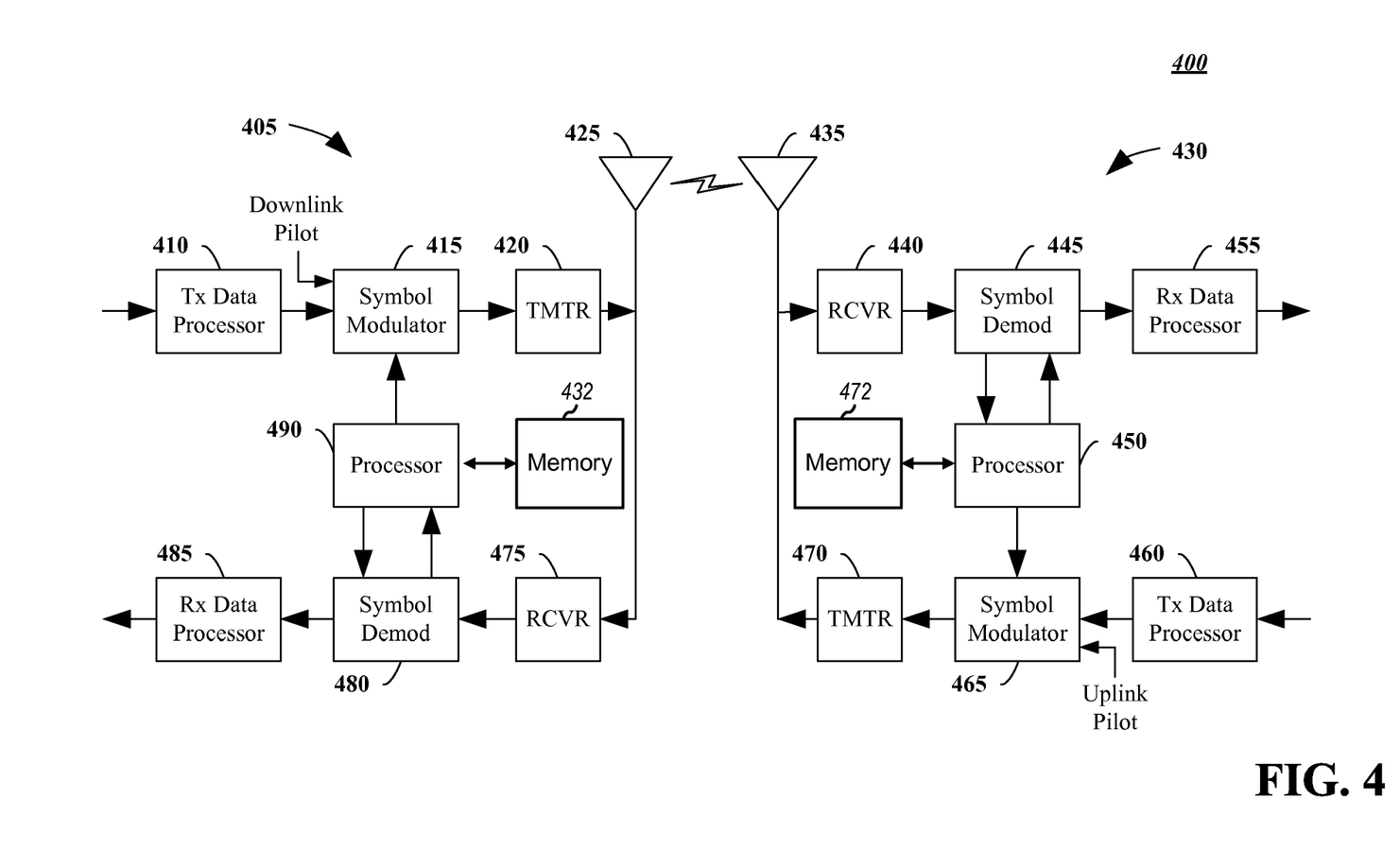
FIG. 4 is an illustration of a wireless network environment that can be employed in conjunction with the various systems and methods described herein.

FIG. 4 shows an exemplary wireless communication system 400 in which the wireless device, also referred to as a terminal, and base station may operate. The wireless communication system 400 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems and/or methods described herein to facilitate wireless communication there between.

Referring now to FIG. 4, on a downlink, at access point 405, a transmit (TX) data processor 410 receives, formats, codes, interleaves, and modulates (or symbol maps) traffic data and provides modulation symbols ("data symbols"). A symbol modulator 415 receives and processes the data symbols and pilot symbols and provides a stream of symbols. A symbol modulator 420 multiplexes data and pilot symbols and provides them to a transmitter unit (TMTR) 420. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 420 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 425 to the terminals. At terminal 430, an antenna 435 receives the downlink signal and provides a received signal to a receiver unit (RCVR) 440. Receiver unit 440 conditions (e.g., filters, amplifies, and frequency downconverts) the received signal and digitizes the conditioned signal to obtain samples. A symbol demodulator 445 demodulates and provides received pilot symbols to a processor 450 for channel estimation. Symbol demodulator 445 further receives a frequency response estimate for the downlink from processor 450, performs data demodulation on the received data symbols to obtain data symbol estimates (which are estimates of the transmitted data symbols), and provides the data symbol estimates to an RX data processor 455, which demodulates (i.e., symbol demaps), deinterleaves, and decodes the data symbol estimates to recover the transmitted traffic data. The processing by symbol demodulator 445 and RX data processor 455 is complementary to the processing by symbol modulator 415 and TX data processor 410, respectively, at access point 405.

On the uplink, a TX data processor 460 processes traffic data and provides data symbols. A symbol modulator 465 receives and multiplexes the data symbols with pilot symbols, performs modulation, and provides a stream of symbols. A transmitter unit 470 then receives and processes the stream of symbols to generate an uplink signal, which is transmitted by the antenna 435 to the access point 1305.

At access point 405, the uplink signal from terminal 430 is received by the antenna 425 and processed by a receiver unit 475 to obtain samples. A symbol demodulator 480 then processes the samples and provides received pilot symbols and data symbol estimates for the uplink. An RX data processor 485 processes the data symbol estimates to recover the traffic data transmitted by terminal 430. A processor 490 performs channel estimation for each active terminal transmitting on the uplink. Multiple terminals may transmit pilot concurrently on the uplink on their respective assigned sets of pilot subbands, where the pilot subband sets may be interlaced.

Processors 490 and 450 direct (e.g., control, coordinate, manage, etc.) operation at access point 405 and terminal 430, respectively. Respective processors 490 and 450 can be associated with memory units 432 and 472 that store program codes and data. Processors 490 and 450 can also perform computations to derive frequency and impulse response estimates for the uplink and downlink, respectively.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

The techniques described herein may be implemented by various means. For example, these techniques may be implemented in hardware, software, or a combination thereof. For a hardware implementation, the processing units used for FLO network acquisition may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 490 and 450.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for sensing a signaling parameter in a waveform received via a network, the method comprising:

determining a synchronization point on a transmitted extended frame being transmitted in the waveform, the transmitted extended frame comprising a plurality of data frames, each of the data frames comprising a plurality of Orthogonal Frequency Division Multiplexing (OFDM) symbols;

locating a Signaling Parameter Channel (SPC) in the extended frame, wherein the SPC is only located after all of the plurality of data frames in the extended frame and the SPC comprises a periodic waveform based on at least one OFDM symbol associated with the SPC;

based at least in part on the at least one OFDM symbol associated with the SPC, determining the signaling parameter, wherein the signaling parameter contains information identifying a characteristic of the waveform; and based at least in part on the signaling parameter, decoding at least one of the data frames of the extended frame.

2. The method of claim 1, wherein locating the SPC in the extended frame comprises locating a pilot symbol.

3. The method of claim 2, wherein locating a pilot symbol comprises locating a time domain symbol.

4. The method of claim 2, wherein locating the SPC further comprises decoding a plurality of signaling parameter symbols located a predetermined distance from the pilot symbol.

5. The method of claim 1, wherein the signaling parameter comprises a Fast Fourier Transform (FFT) size.

6. The method of claim 1, wherein the signaling parameter comprises a frequency guard interval.

7. The method of claim 1, wherein the signaling parameter comprises a slot to interlace mapping.

8. The method of claim 1, further comprising replicating the transmission of the signaling parameter.

9. The method of claim 8, wherein replicating the transmission of the signaling parameter comprises replicating the transmission of the signaling parameter in a time domain.

10. An apparatus comprising:
a receiver;
a processor coupled to the receiver;
a memory coupled to the processor, the memory configured to cause the processor to implement a method for sensing a signaling parameter in a waveform received via a network, the method comprising:
determining a synchronization point on a transmitted extended frame being transmitted in the waveform, the transmitted extended frame comprising a plurality of data frames, each data frame comprising a plurality of Orthogonal Frequency Division Multiplexing (OFDM) symbols;

locating a Signaling Parameter Channel (SPC) in the extended frame, wherein the SPC is only located after all of the plurality of data frames in the extended frame and the SPC comprises a periodic waveform based on at least one OFDM symbol associated with the SPC;

based at least in part on the at least one OFDM symbol associated with the SPC, determining the signaling parameter, wherein the signaling parameter contains information identifying a characteristic of the waveform; and based at least in part on the signal parameter, decoding a data frame of the extended frame.

11. The apparatus of claim 10, wherein locating the SPC in the extended frame comprises locating a pilot symbol.

12. The apparatus of claim 11, wherein locating a pilot symbol comprises locating a time domain symbol.

13. The apparatus of claim 11, wherein locating the SPC further comprises decoding a plurality of signaling parameter symbols located a predetermined distance from the pilot symbol.

14. The apparatus of claim 10, wherein the signaling parameter comprises a Fast Fourier Transform (FFT) size.

15. The apparatus of claim 10, wherein the signaling parameter comprises a frequency guard interval.

16. The apparatus of claim 10, wherein the signaling parameter comprises a slot to interlace mapping.

17. The apparatus of claim 10, wherein the method further comprises replicating the transmission of the signaling parameter.

18. The apparatus of claim 17, wherein replicating the transmission of the signaling parameter comprises replicating the transmission of the signaling parameter in a time domain.

19. An apparatus for sensing a signaling parameter in a waveform received via a network, the apparatus comprising:
means for determining a synchronization point on a transmitted extended frame being transmitted in the waveform, the transmitted extended frame comprising a plurality of data frames, each of the data frames comprising a plurality of Orthogonal Frequency Division Multiplexing (OFDM) symbols, and the extended frame comprising a plurality of data frames;

means for locating a Signaling Parameter Channel (SPC) in the frame, wherein the SPC is only located after all of the plurality of data frames in the extended frame and the SPC comprises a periodic waveform based on at least one OFDM symbol associated with the SPC;

means for, based at least in part on the at least one OFDM symbol associated with the SPC, determining the signaling parameter, wherein the signaling parameter contains information identifying a characteristic of the waveform; and means for decoding, based at least in part on the signaling parameter, a data frame of the extended frame.

20. The apparatus of claim 19, wherein the means for locating the SPC in the extended frame comprises means for locating a pilot symbol.

21. The apparatus of claim 20, wherein the means for locating a pilot symbol comprises means for locating a time domain symbol.

22. The apparatus of claim 20, wherein the means for locating the SPC further comprises means for decoding a plurality of signaling parameter symbols located a predetermined distance from the pilot symbol.

23. The apparatus of claim 19, wherein the signaling parameter comprises a Fast Fourier Transform (FFT) size.

24. The apparatus of claim 19, wherein the signaling parameter comprises a frequency guard interval.

25. The apparatus of claim 19, wherein the signaling parameter comprises a slot to interlace mapping.

26. The apparatus of claim 19, wherein further comprising means for replicating the transmission of the signaling parameter.

27. The apparatus of claim 26, wherein means for replicating the transmission of the signaling parameter comprises replicating the transmission of the signaling parameter in a time domain.

28. A product comprising a non-transitory machine-readable storage medium and programming embodied in the machine-readable storage medium for implementing a method for retrieving a signaling parameter in a waveform received via a network, the method comprising:
synchronizing the receipt of a transmitted extended frame being transmitted in the waveform, the transmitted extended frame comprising a plurality of data frames, each of the data frames comprising a plurality of Orthogonal Frequency Division Multiplexing (OFDM) symbols;

locating a Signaling Parameter Channel (SPC) in the extended frame, wherein the SPC is located only after all of the plurality of data frames in the extended frame and the SPC comprises a periodic waveform based on at least one OFDM symbol associated with the SPC;

based at least in part on the at least one OFDM symbol associated with the SPC, determining the signaling parameter, wherein the signaling parameter contains information identifying a characteristic of the waveform; and based at least in part on the signaling parameter, decoding a data frame of the extended frame.

29. The product of claim 28, wherein locating the SPC in the extended frame comprises locating a pilot symbol.

30. The product of claim 29, wherein locating a pilot symbol comprises locating a time domain symbol.

31. The product of claim 29, wherein locating the SPC further comprises decoding a plurality of signaling parameter symbols located a predetermined distance from the pilot symbol.

32. The product of claim 28, wherein the signaling parameter comprises a Fast Fourier Transform (FFT) size.

33. The product of claim 28, wherein the signaling parameter comprises a frequency guard interval.

34. The product of claim 28, wherein the signaling parameter comprises a slot to interlace mapping.

35. The product claim 28, wherein the method further comprising replicating the transmission of the signaling parameter.

36. The product of claim 35, wherein replicating the transmission of the signaling parameter comprises replicating the transmission of the signaling parameter in a time domain.

37. The method of claim 1, wherein the periodic waveform has a periodicity of 1024 samples in four periods.

38. The apparatus of claim 10, wherein the periodic waveform has a periodicity of 1024 samples in four periods.

39. The apparatus of claim 19, wherein the periodic waveform has a periodicity of 1024 samples in four periods.

40. The product of claim 28, wherein the periodic waveform has a periodicity of 1024 samples in four periods.

* * * * *